United States Patent [19]
Imoto et al.

[11] Patent Number: 4,630,871
[45] Date of Patent: Dec. 23, 1986

[54] ANTISKID CONTROL DEVICE

[75] Inventors: Yuzo Imoto, Kariya; Hideo Wakata, Nagoya; Toshihiro Takei, Okazaki; Yoshiyuki Hattori, Toyoake; Yoshihisa Nomura, Toyota, all of Japan

[73] Assignee: Nippondenso Co., Ltd., Kariya, Japan

[21] Appl. No.: 792,927

[22] Filed: Oct. 30, 1985

[30] Foreign Application Priority Data

Oct. 31, 1984 [JP] Japan .................. 59-227970

[51] Int. Cl.$^4$ .............................................. B60T 8/04
[52] U.S. Cl. .................................. 303/113; 303/114
[58] Field of Search ............... 303/103, 110, 113, 114, 303/117, 119

[56] References Cited

U.S. PATENT DOCUMENTS 4,589,706  5/1986  Leiber .................................. 303/114

FOREIGN PATENT DOCUMENTS 49-28307  7/1974  Japan .
49-32494  8/1974  Japan .

OTHER PUBLICATIONS

SAE Hydraulically Boosted Brakes (Oct. 13-17, 1975).

Primary Examiner—Duane A. Reger
Attorney, Agent, or Firm—Cushman, Darby & Cushman

[57] ABSTRACT

An antiskid control device including a main line system for a usual braking operation and a subline system for an antiskid control, in which the flow rate of the subline system is smaller than the flow rate of the mainline system. The main piping system is provided with a cut-off valve which opens at a usual braking operation and closes at an antiskid control. The subline system is provided with a first control valve for opening the subline system and a second control valve for opening or closing the subline system at an antiskid control. The second control valve opens the subline system to supply a small quantity of brake oil to the wheel cylinder, and closes the subline system to release the brake oil in the wheel cylinder to the outside thereof.

9 Claims, 2 Drawing Figures

Fig. I

ANTISKID CONTROL DEVICE

BACKGROUND OF THE INVENTION

1. Field of the Invention

The present invention relates to a brake system of a vehicle. More particularly, it relates to an antiskid control device to prevent wheels of the vehicle from locking when the brake system is operated, so that drivability of the vehicle is maintained.

2. Description of the Related Art

In conventional brake system of a vehicle, a master cylinder, a reservoir, and wheel cylinders are connected through a piping (line) system so that, when a brake pedal is operated, oil pressure generated in the master cylinder is transmitted to the wheel cylinder, and when the brake pedal is released, the oil in the master cylinder is released to the reservoir and thus the pressure in the wheel cylinder is reduced. An antiskid control device is provided in the brake system, and a valve disposed in a line between the master cylinder and the wheel cylinder is controlled according to a state of a wheel, so that oil pressure in the wheel cylinder is reduced when the wheel locks.

Such an antiskid control device is disclosed, for example, in Japanese Examined Patent Publication Nos. 49-28307 and 49-32494.

The above conventional construction, in which a usual braking operation and antiskid operation are carried out by one line system, has the following problems. If the line system and the control valve are constructed so as to supply enough pressurized oil to the wheel cylinders during a usual braking operation, the flow rate of the pressurized oil supplied to the wheel cylinders during antiskid control is too high to ensure control stability. Conversely, if the line system and the control valve are constructed so as to supply a relatively small quantity of pressurized oil to the wheel cylinders for the antiskid control, the quantity of pressurized oil supplied to the wheel cylinder during a usual braking operation is too small to obtain a sufficient braking effect.

SUMMARY OF THE INVENTION

Therefore, an object of the present invention is to provide an antiskid control device by which enough pressurized oil is supplied to the wheel cylinder during a usual braking operation and a proper quantity of pressurized oil is supplied to the wheel cylinder during an antiskid action.

According to the present invention, there is provided an antiskid control device comprising means for discharging pressurized fluid, a main piping (line) system, means for switching an open-close means provided in the main line system, and a sub-line system. The main line system has a main line connecting the discharging means to the wheel cylinders, and the open-close means for opening and closing the main line. The switching means controls the open-close means to normally open the main line and close the main line when locking occurs in the wheel of the vehicle. The sub-line system has a sub-line connecting the discharging means to the wheel cylinder, a first control valve opening and closing the sub-line, a second control valve opening and closing the sub-line when the first control valve opens the sub-line, means for controlling the first and the second control valves to open and close according to the locking condition of the wheel, and means for releasing pressurized fluid in the wheel cylinder to the outside thereof when the second control valve is closed. The controlling means controls the first control valve to normally close the sub-line, and open the sub-line when locking occurs, and controls the second control valve to open or close when locking occurs. The sub-line system introduces a pressurized fluid to the wheel cylinder according to the locking condition when the second control valve is open, the flow rate of the pressurized fluid being smaller than that of the pressurized fluid introduced by the main line system.

BRIEF DESCRIPTION OF THE DRAWINGS

The present invention may be more fully understood from the description of the preferred embodiments of the invention set forth below, together with the accompanying drawings, in which.

DESCRIPTION OF THE PREFERRED EMBODIMENTS

The present invention will now be described with reference to the following preferred embodiments.

Figure 1:
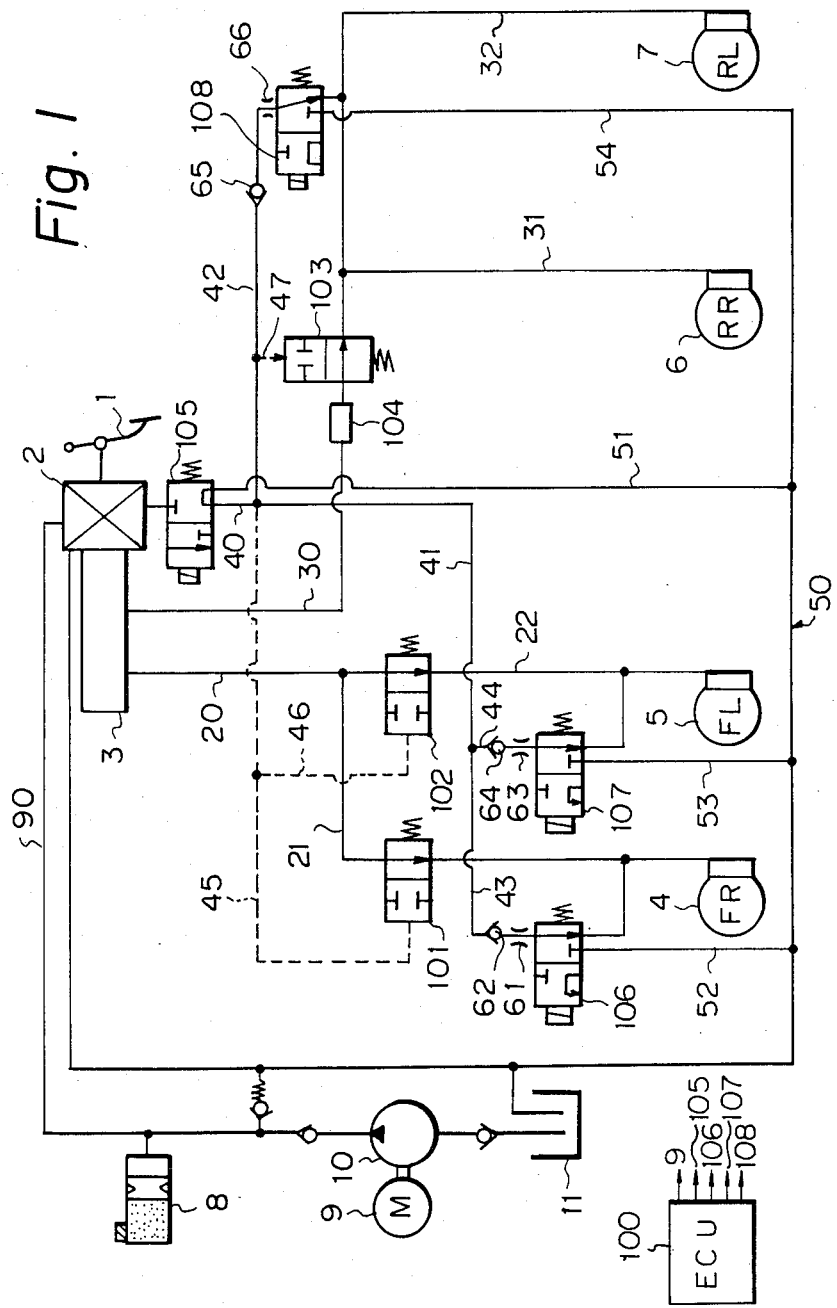
FIG. 1 shows a hydraulic circuit of a first embodiment of tne present invention.
Figure 2:
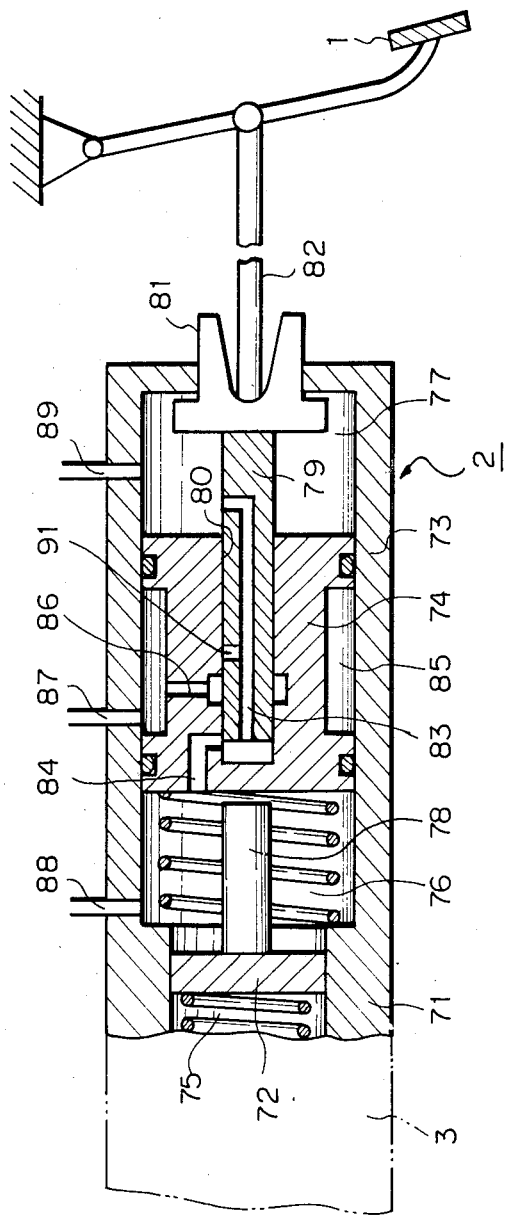
FIG. 2 shows a sectional view of a brake booster and a master cylinder.

FIGS. 1 and 2 show a first embodiment of the present invention. Referring to these figures, a brake pedal 1 is connected to a master cylinder 3 through a brake booster 2, so that an oil pressure generated by operation of the brake pedal 1 is transmitted to wheel cylinders 4,5,6,7 of the front right (FR) wheel, the front left (FL) wheel, the rear right (RR) wheel, and the rear left (RL) wheel, respectively, whereby braking is carried out. The brake booster 2 contains, as described later, oil pressurized to, for example, 150 to 200 kg/cm$^2$ through an accumulator 8. The brake booster 2 exerts this pressure on a push rod connected to a piston of the master cylinder 3 in response to an operation of the brake pedal 1, to reduce the force needed by the driver when operating the brake pedal. The accumulator 8 contains pressurized oil supplied from a pump 10 driven by a motor 9, and maintains the oil at a certain pressure.

The master cylinder 3 has two pressure chambers (not shown) from which brake oil is discharged at the same pressure. The chambers are connected to main lines 20 and 30, respectively. The main line 20 diverges to branch lines 21 and 22; the branch line 21 being connected to the wheel cylinder 4 of the front right wheel, and the branch line 22 being connected to the wheel cylinder 5 of the front left wheel. A cut-off valve 101 is provided in the branch line 21. The cut-off valve 101 opens the branch line 21 at the normal valve position, as shown in the drawing, and closes the branch line 21 at the offset valve position (not shown). A cut-off valve 102 is provided in the branch line 22, and opens or closes the branch line 22 in the same way as the cut-off valve 101. The main line 30 diverges to branch lines 31 and 32; the branch line 31 being connected to the wheel cylinder 6 of the rear right wheel, and the branch line 32 being connected to the wheel cylinder 7 of the rear left wheel. A cut-off valve 103 is provided in the main line 30 downstream from the divergent portion, and opens or closes the main line 30 in the same way as the cut-off valves 101 and 102. A previously known proportioning valve 104 is provided upstream of the cut-off valve 103, so that brake oil having a pressure lower than the discharge pressure of the master cylinder 3 is supplied to the wheel cylinders 6 and 7 of the rear wheels when the oil pressure in the main line 30 is more than a predetermined constant value.

The cut-off valves 101, 102, and 103 are, for example, spool valves, which are switched to close the lines 21, 22, and 30 when a pressure acting on one end face of each spool valve becomes larger than a predetermined constant value. The pressurized oil for switching the spool valves is supplied through a first control valve 105, as described later. At the normal valve position shown in the drawing, the cut-off valves 101, 102, and 103 are not supplied with pressurized oil from the first control valve 105, so that the lines 21, 22, and 30 are open. In this state, a usual brake operation is carried out. That is, oil pressure generated in the master cylinder 3 by operation of the brake pedal 1 is transmitted to the wheel cylinder 4 through the branch line 21 and the cut-off valve 101, to the wheel cylinder 5 through the branch line 22 and the cut-off valve 102, and to the wheel cylinders 6 and 7 through the cut-off valve 103 and the branch lines 31 and 32. The flow rate of the brake oil in the main lines 20 and 30 is sufficient to enable a usual braking operation; i.e., oil pressure in the wheel cylinders 4, 5, 6, and 7 is rapidly increased in response to an operation of the brake pedal 1.

An engine control unit (ECU) 100 provided with a microcomputer starts the motor 9 to initiate an antiskid operation to relieve an excessive braking action at the wheel, if the ECU judges from the wheel velocity output by a wheel velocity sensor (not shown) that a wheel or wheels will lock, namely, if the ECU judges that the deceleration or slip rate of the wheel is too large.

The construction of the system for carrying out an antiskid operation is described below.

The brake booster 2 is connected to a subline 40, which is provided with the first control valve 105 for opening or closing the subline 40. The subline 40 diverges the outlet port of the first control valve 105 into a front subline 41 and a rear subline 42. The front subline 41 diverges into branch lines 43 and 44 downstream of the point at which the front and rear sublines 41 and 42 diverge. The branch line 43 is connected to the branch line 21 of the main line 20 to communicate with the wheel cylinder 4 of the front right wheel, and the branch line 44 is connected to the branch line 22 of the main line 20 to communicate with the wheel cylinder 5 of the front left wheel. The rear subline 42 is connected to the branch line 31 through the branch line 32 of the main line 30, whereby the rear subline 42 is communicated with the wheel cylinders 6 and 7 of the rear wheels. Accordingly, brake oil discharged from the brake booster 2 through the subline 40 is supplied to the wheel cylinders 4, 5, 6, and 7.

The first control valve 105 is a three-port-two-position valve, which, in the normally closed position shown in the drawing, closes the upstream portion of the subline 40 from the downstream portion of the subline 40, which is communicated with a reservoir 11. That is, the downstream portion of the subline 40 communicates with the reservoir 11 through a branch line 51 connected to a return line 50 communicated with the reservoir 11, so that pressurized oil in the front and rear sublines 41 and 42 is returned to the reservoir 11. Conversely, in the offset (open) position not shown in the drawing, the first control valve 105 opens the subline 40 and, at the same time, closes the subline 40 from communication with the branch line 51. Upon a usual braking operation, the first control valve 105 is in the normally closed position, i.e., the subline 40 is normally closed, and if a command signal for starting an antiskid control is input from the ECU, the first control valve 105 is switched to the offset (open) position so that discharged oil from the brake booster 2 flows into the subline 40. Thus, when the first control valve 105 is switched to the offset (open) position, the pressure in the subline 40 rises, so that the cut-off valves 101, 102, and 103 are switched to the offset (closed) position (not shown in the drawing) by that pressure to close the main lines 20 and 30, respectively. Transmitting lines 45, 46, and 47 are provided to pass the pressure in the subline 40 onto the cut-off valves 101, 102, and 103, as described above. Each transmitting line 45, 46, and 47 causes the pressure in the subline 40 to act on end faces of the cut-off valves 101, 102, and 103, respectively.

Second control valves 106, 107, and 108 are provided in the branch lines 43 and 44 of the front subline 41 and the rear subline 42, respectively. These second control valves 106, 107, and 108 are three-port-two-position valves, which are switched in response to a signal input from the ECU. That is, the second control valves 106, 107, and 108 are switched according to the signal output because the wheel cylinder pressure at the wheel has increased or decreased. At this time, brake oil is either supplied to the wheel cylinders 4, 5, 6, and 7, or the brake oil is released to the reservoir 11.

The second control valve 106 carries out an antiskid control for the wheel cylinder 4 of the front right wheel. Namely, the second control valve 106 opens the branch line 43 of the front subline 41 in the normally open position shown in the drawing to allow pressurized oil in the front subline 41 to flow to the wheel cylinder 4. An orifice 61 is formed just upstream of the second control valve 106 in the branch line 43, so that, during an antiskid control, the flow rate of pressurized oil supplied to the wheel cylinder 4 is less than the flow rate of pressurized oil during a usual braking operation, to obtain a proper antiskid control. This orifice 61 may be formed in the second control valve 106, or downstream from the second control valve 106. Note, a check valve 62 is provided in the branch line 43 to prevent the brake oil in the branch line 43 flowing backward 6, i.e., upstream. In the offset (closed) position not shown in the drawing, the second control valve 106 closes the branch line 43 and allows the down stream portion of the branch line 43 to communicate with a branch line 52 of the return line 50. Accordingly, the wheel cylinder 4 communicates with the return line 50 through the downstream portion of the branch line 43, so that the brake oil in the wheel cylinder 4 returns to the reservoir 11 and thus the pressure in the wheel cylinder 4 is immediately reduced.

The second control valves 107 and 108 operate in a way similar to the second control valve 106. That is, in the normally open position shown in the drawing, the second control valve 107 allows brake oil in the front subline 41 to flow to the wheel cylinder 5 of the front left wheel, and wherein the offset (closed) position not shown in the drawing, allows the downstream portion of the branch line 44 to communicate with a branch line 53 of the return line 50 so that the brake oil in the wheel cylinder 5 returns to the reservoir 11. An orifice 63 is formed upstream of the second control valve 107 in the branch line 44, and a check valve 64 is provided upstream of the orifice 63 to prevent oil in the branch line 44 from flowing backward. When in the normally open position shown the second control valve 108 allows brake oil in the rear subline 42 to flow to the wheel cylinders 6 and 7 of the rear wheels, and when in the offset (closed) position not shown in the drawing, allows the branch lines 31 and 32 to communicate with a branch line 54 of the return line 50, so that the brake oil in the wheel cylinders 6 and 7 is returned to the reservoir 11. An orifice 66 is formed upstream of the second control valve 108 in the rear subline 43, and a check valve 65 is provided upstream of the orifice 66 to prevent oil in the subline 42 from flowing backward.

An example of an antiskid control for the front right wheel is now described. After the cut-off valve 101 is switched to the offset (closed) position by pressurized oil supplied from the transmitting line 45 and the first control valve 105, the second control valve 106 is switched to the offset (closed) position to return the brake oil in the wheel cylinder 4 to the reservoir 11, and thus release the baking action at the right front wheel. Then, if the wheel velocity of the right front wheel becomes a value not a skid value, the second control valve 106 is switched to the normally opened position to open the branch line 43, so that the brake oil in the front subline 41 is allowed to flow to the wheel cylinder 4. The oil pressure in the wheel cylinder is gradually increased due to the flow-resistance of the orifice 61.

The brake booster 2 and the master cylinder 3 are constructed in such a manner that the front and rear sublines 41 and 42 are supplied with brake oil having a pressure substantially equal to the pressure in the main lines 20 and 30 after the first control valve 105 is switched from the normally closed position to the offset (open) position, so that the usual braking operation is stopped and an antiskid control is started. The construction of the brake booster 2 and the master cylinder 3 are described with reference to FIG. 2.

FIG. 2 shows the brake booster 2 and a part of the master cylinder 3. In the drawing, a primary piston 72 is slidably fitted in a housing 71 of the master cylinder 3, and a booster piston 74 is slidably fitted in a housing 73 of the brake booster 2. The housings 71 and 73 are formed coaxially and in one body. The primary piston 72 divides the inside of the housings 71 and 73 to define a pressure chamber 75 in the housing 71 and one end of an atmospheric chamber 76 in the housing 73. The booster piston 74 divides the inside of the housing 73 to form another end of the atmospheric chamber 76 at one end surface thereof and a pressure chamber 77 at the other end surface thereof. A push rod 78 fixed to the primary piston 72 extends to the booster piston 74. A control piston 79 is slidably fitted in a bore 80 formed in the booster piston 74, and projects into the pressure chamber 77, the end of the control piston 79 being connected to an intermediate piston 81 fixed to a push rod 82. The push rod 82 is connected to the brake pedal 1; thus the control piston 79 is connected to the brake pedal 1. A passage 83 formed in the control piston 79 communicates with the pressure chamber 77, and a passage 84 formed in the booster piston 74 connects the atmospheric chamber 76 and a left side portion of the bore 80, so that the pressure chamber 77 communicates with the atmospheric chamber 76 when the control piston 79 is positioned backward (to the right in the drawing) relative to the booster piston 74. The external diameter of the center portion of the booster piston 74 is smaller than the end portion thereof, so that a high pressure chamber 85 is formed between the outer surface of the booster piston 74 and internal surface of the housing 73. The high pressure chamber 85 can communicate with the passage 83 of the control piston 79 through a passage 86 formed in the booster piston 74 when the control piston 79 is displaced further backward. A passage 91 formed in the control piston 79 in a radial direction can communicate with the passage 86.

A port 87 is formed in the housing 73 to communicate with the high pressure chamber 85, and is connected to the accumulator 8 through a line 90, to ensure a constant supply of a high pressure oil (for example, 150 to 200 kg/cm$_2$). A port 88 is formed in the housing 73 and communicates with the return line 50 to ensure a constant communication with the reservoir 11. A port 89 is formed in the housing 73 to communicate the pressure chamber 77 and the subline 40.

The brake booster 2 constructed as described above operates as follows. When the brake pedal 1 is operated, the push rod 82 is displaced to the left in the drawing, so that the control piston 79 is displaced to the left by the intermediate piston 81 to close the passage 84, so that the pressure chamber 77 is cut-off from the atmospheric chamber 76. When the brake pedal 1 is further operated, the passage 86 communicates with the passages 91 and 83, so that the high pressure chamber 85 communicates with the pressure chamber 77 through the passages 86, 91, and 83, and thus high pressure oil is allowed to flow into the pressure chamber 77. As a result, the booster piston 74 is moved to the left by the pressure in the pressure chamber 77 to exert pressure on the push rod 78, so that the primary piston 72 is moved to the left, while the control piston 79 remains in a position that depends on the position of the brake pedal 1. Thus the booster piston 74 moves relative to the control piston 79, so that the passage 86 is closed by the surface of the control piston 79, and therefore, the high pressure chamber 85 is cut-off from the pressure chamber 77, so that the booster piston 74 does not move. When the brake pedal 1 is further operated, the pressure chamber 77 communicates with the high pressure chamber 85 again, so that the pressure on the booster piston 74 is increased and it exerts force on the primary piston 72.

The pressure of oil discharged from the port 89 varies depending on position of the brake pedal 1. Namely, the pressure is proportional to the discharge pressure of the master cylinder 3. The discharge pressure from the port 89 is adjusted to a pressure substantially equal to the discharge pressure from the master cylinder 3 by selecting the sectional areas of the the primary piston 72, the booster piston 74, and the control piston 79, as in a previously known method. In this embodiment, both discharge pressures have substantially the same value.

This embodiment of the present invention operates as follows.

In a condition in which a braking operation is not carried out, the first control valve 105 is in the normally closed position, thereby closing the subline 40, and the cut-off valves 101, 102, and 103 are in the normally open position, respectively, thereby opening the main lines 20 and 30. Therefore, when the brake pedal 1 is operated, the pressurized oil discharged from the master cylinder 3 flows in the main line 20 through the cut valves 101 and 102 and is supplied to the wheel cylinders 4 and 5 of the front wheels, and flows in the main line 30 through the proportioning valve 104 and the cut valve 103 and supplied to the wheel cylinders 6 and 7 of the rear wheels.

At this stage, if any one of the wheels locks, causing a wheel condition at which antiskid control is started, the ECU switches the first control valve 105 to supply pressurized oil to the front and rear sublines 41 and 42. As a result, the oil pressure is transmitted to the cut-off valves 101, 102, and 103 through the transmitting lines 45, 46, and 47, respectively, so that the cut-off valves 101, 102, and 103 are switched to the offset (closed) position to close the main lines 20 and 30. Then, pressure in the wheel cylinder of the wheel which is locking is reduced, as described below, and the excessive braking action at this wheel is released.

When the ECU outputs a signal for the release of an excessive braking action at, for example, the rear wheel, the second control valve 108 is switched to the offset (closed) position to close the rear subline 42 and allow the branch lines 31 and 32 to communicate with the return line 50 to release the pressurized oil in the wheel cylinders 6 and 7 to the reservoir 11. Thus, if the rotational velocity of the rear wheel recovers and the slip page is reduced, the second control valve 108 is switched to the normally open position to supply pressurized oil to the wheel cylinders 6 and 7. As described above, the second control valve 108 is controlled according to the rotational acceleration or slippage of the wheel, so that the antiskid control is carried out. Usually, an antiskid control is not carried out for the front wheels and the front wheel cylinders 4 and 5 are supplied with pressurized oil through the front subline 41 and the second control valves 106 and 107, so that a usual braking operation is carried out for the front wheels. However, if a locking condition is sensed at the front wheels, antiskid control is carried out for the front wheels in the same way as for the rear wheel as described above. Note, antiskid control can be halted by stopping the vehicle or turning off a brake switch provided on the brake pedal 1.

According to this embodiment as described above, since during a usual braking operation, sufficient pressurized oil is supplied to the wheel cylinders 4, 5, 6, and 7 through the main line 20 and 30, responsiveness and effect of the braking action are improved. Also, since only a small amount of pressurized oil is supplied to the wheel cylinders through the orifices 42, 43, and 44 during an antiskid control, this control is stably carried out. Further since when the first control valve 105 is switched to the offset (open) position in which the subline 40 is opened, that is, when starting antiskid control, the cut-off valves 101, 102, and 103 are quickly switched by pressure received in the subline 40 to close the main lines 20 and 30, the increase in oil pressure in the wheel cylinders 4, 5, 6, and 7 is stopped almost at the same time as the switching of the first control valve 105. Moreover, since after the cut-off valves 101, 102, and 103 are switched to the offset (closed) position, the second control valves 105, 106, and 107 supply or release pressurized oil at the wheel cylinders 4, 5, 6, and 7, the master cylinder 3 will not transmit pressure pulsations in the wheel cylinders, so that a kick back phenomenon is prevented.

Figure 3:
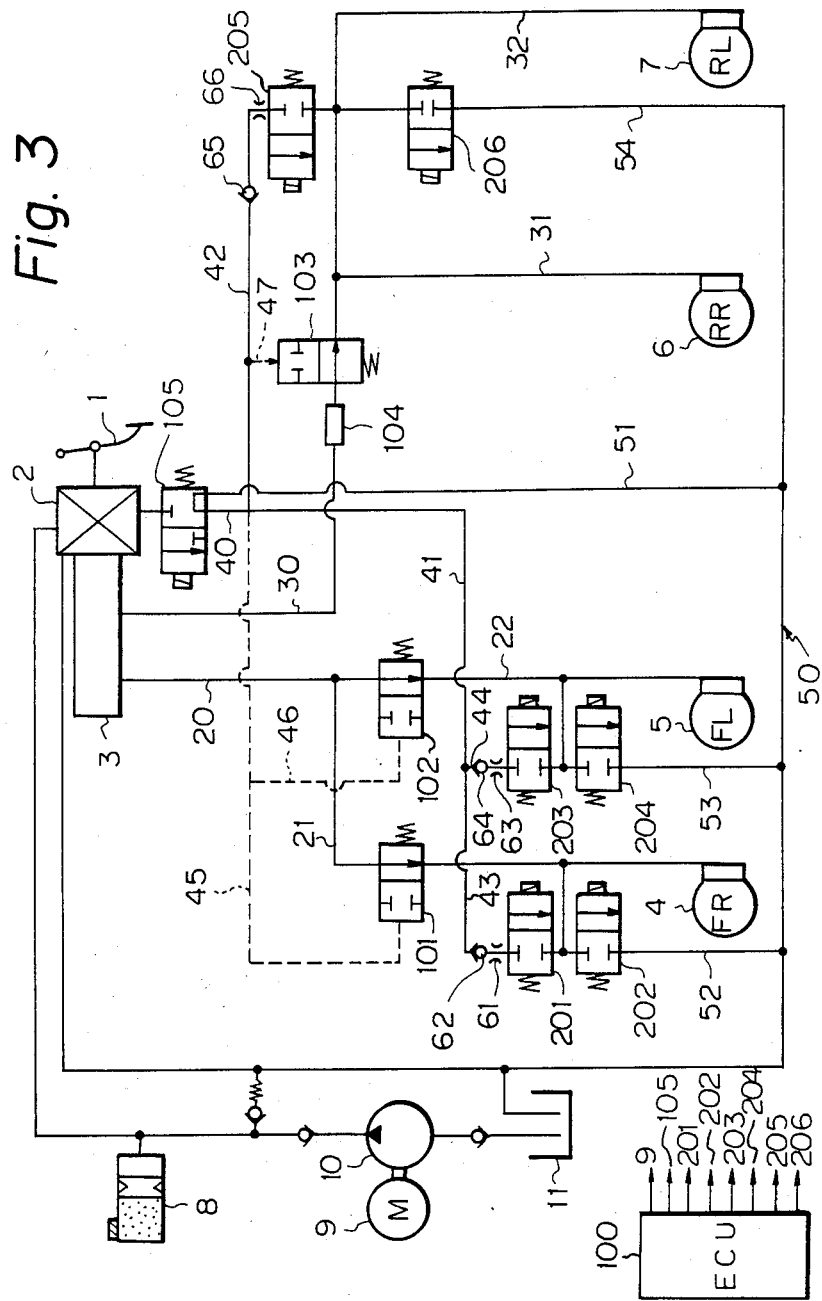
FIG. 3 shows a hydraulic circuit of a second embodiment of the present invention.

FIG. 3 shows a second embodiment of the present invention. The second embodiment is different from the first embodiment in the construction of the second control valve and in the provision of a third control valve, but has the same construction as the first embodiment in all other parts. Therefore, only the second and third control valves are now described, and the other parts are given the same numerical references as in the first embodiment instead of omitting the description thereof.

In this embodiment, second and third control valves 201 and 202 control the wheel cylinder 4 of the front right wheel. The second control valve 201 is provided in the branch line 43, and the third control valve 202 is provided in the branch line 52, and are two-port-two-position valves. These valves 201 and 202 close the branch lines 43 and 52 in the normally closed position shown in the drawing, respectively, and open the branch lines 43 and 52 in the offset valve position (not shown in the drawing), respectively. Upon a usual braking operation, the control valves 201 and 202 are positioned in the normally closed position. Conversely, when starting an antiskid control for the right front wheel after the first control valve 105 is switched, to the offset (open) position, the third control valve 202 is switched to the offset (open) position, so that pressurized oil in the wheel cylinder 4 is returned to the reservoir 11 through the branch line 21, the third control valve 202, and the branch line 52, and thus the pressure in the wheel cylinder 4 is immediately reduced. If the pressure in the wheel cylinder 4 is to be increased, the second control valve 201 is switched to the offset (open) position and the third control valve 202 is switched to the normally closed position, so that the branch line 43 is opened and the branch line 52 is closed. As a result, pressurized oil in the subline 40 is supplied to the branch line 21 through the orifice 61 and the second control valve 201 and is sent to the wheel cylinder 4. Accordingly, oil pressure in the wheel cylinder 4 is gradually increased and thus the braking force is increased. If the second and third control valves 201 and 202 are switched to the normally closed position, respectively, the branch lines 43 and 52 are closed, whereby the pressurized oil is kept in the wheel cylinder 4 and the pressure in the wheel cylinder 4 is kept constant.

Similarly, for the front left wheel, the second control valve 203 is provided in the branch line 44 and the third control valve 204 is provided in the branch line 53. These second and third control valves 203 and 204 are two-port-two-position valves, and operate in the same way as the above control valves 201 and 202.

For the rear wheels, the second control valve 205 is provided in the rear subline 42 and the third control valve 206 is provided in the branch line 54. These control valves 205 and 206 are two-port-two-position valves and operate in the same way as the above control valves 201, 202, 203, and 204.

According to the second embodiment, since the oil pressure in the wheel cylinders 4, 5, 6, and 7 can be kept constant, antiskid control can be stabilized. Further, when compared to the construction without the function of keeping pressurized oil in the wheel cylinder, the second embodiment construction decreases the amount of brake oil to be returned to the reservoir 11, and consequently, the volume of the pump 10 can be reduced.

Note, the control valves in the above embodiments can be replaced with three-position valves.

While embodiments of the present invention have been described herein with reference to the attached drawings, many modifications and changes may be made by those skilled in this art without departing from the scope of the invention.

We claim:

1. An antiskid control device controlling pressure in wheel cylinders of a brake system provided in a vehicle for preventing the vehicle from skidding through locking of the wheels thereof, said device comprising;
- means for discharging pressurized fluid,
- a main line system having a main line connecting said discharging means to wheel cylinders, and an open-close means for opening and closing said main line,
- means for switching said open-close means to normally open said main line, and to close said main line when a locking condition occurs in the wheels of the vehicle,
- a subline system having a subline connecting said discharging means to the wheel cylinders, a first control valve opening and closing said subline, a second control valve opening or closing said subline when said first control valve opens said subline, means for controlling said first and second control valves to open or close according to the locking condition of the wheel, means for releasing pressurized fluid in the wheel cylinder to outside thereof when said second control valve closes, said controlling means controlling said first control valve to normally close said subline, and to open said subline when locking occurs, and controlling said second control valve to open or close when locking occurs,
- said subline system introducing a pressurized fluid to the wheel cylinder according to the locking condition when opening, the flow rate of said pressurized fluid in said subline system being smaller than that of the pressurized fluid introduced by said main line system.

2. An antiskid control device according to claim 1, wherein said discharging means has a first and a second pressure source, said first pressure source being connected to said main line, said second pressure source being connected to said subline.

3. An antiskid control device according to claim 2, wherein said first pressure source is a master cylinder of the brake system, and said second pressure source is the brake booster provided between the brake pedal and the master cylinder and reducing a force which a driver must apply to the brake pedal.

4. An antiskid control device according to claim 3, wherein said brake booster discharges a pressurized fluid when the brake pedal is more than a predetermined value.

5. An antiskid control device according to claim 2, wherein said first and second pressure sources discharge fluid at the same pressure.

6. An antiskid control device according to claim 1, wherein said switching means is a transmitting tube connecting a portion of said subline downstream from said first control valve and said open-close means, which closes said main line when receiving a pressure in said subline.

7. An antiskid control device according to claim 1, wherein said subline system has an orifice wherein the flow rate thereof is smaller than that of said main line system.

8. An antiskid control device according to claim 1, wherein said subline system has a check valve preventing fluid from flowing from the wheel cylinder to said discharging means.

9. An antiskid control device according to claim 1, wherein said subline system has a third control valve to maintain a pressure in the wheel cylinder at a constant level or to release such pressure.

* * * * *